Fig. 2.

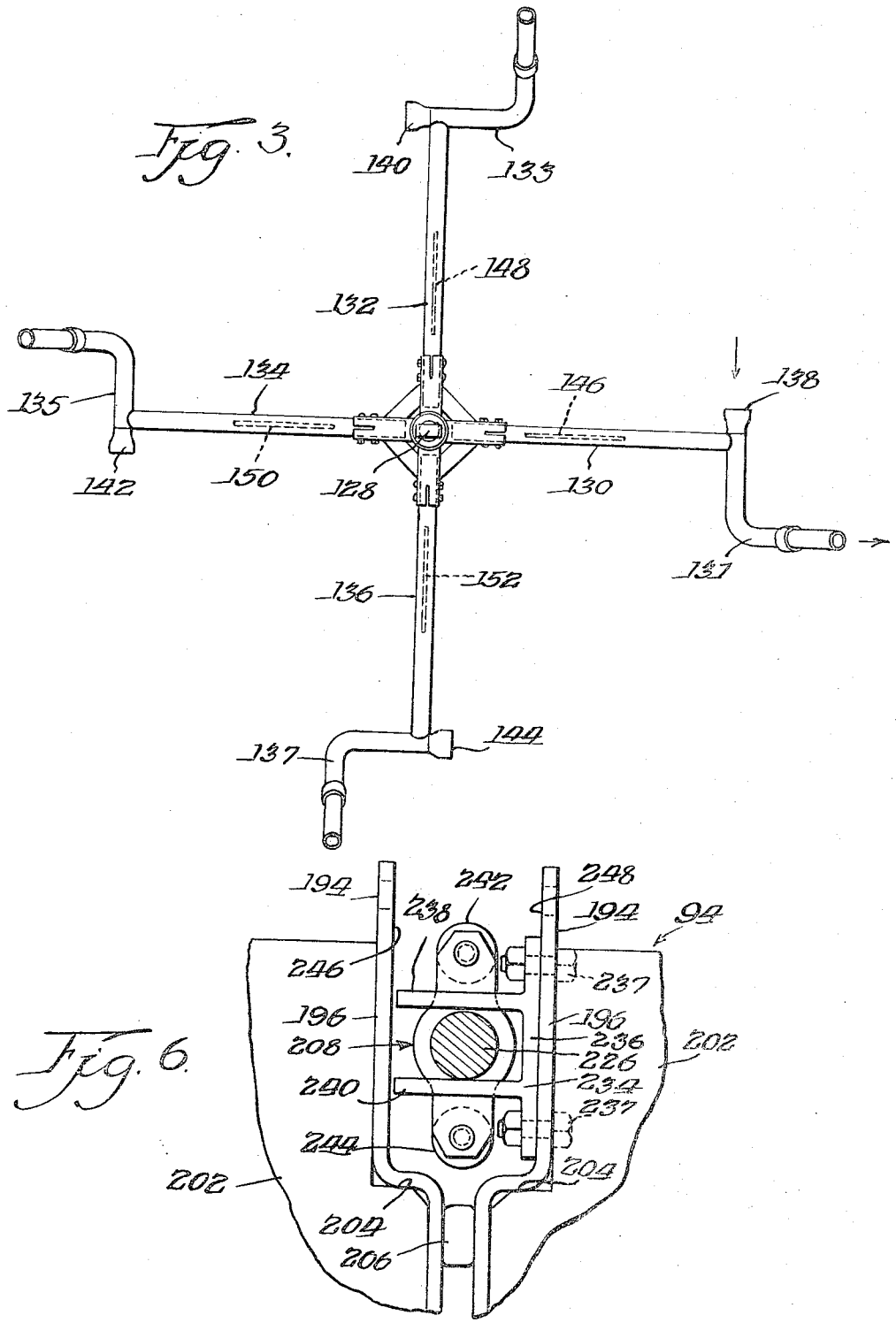

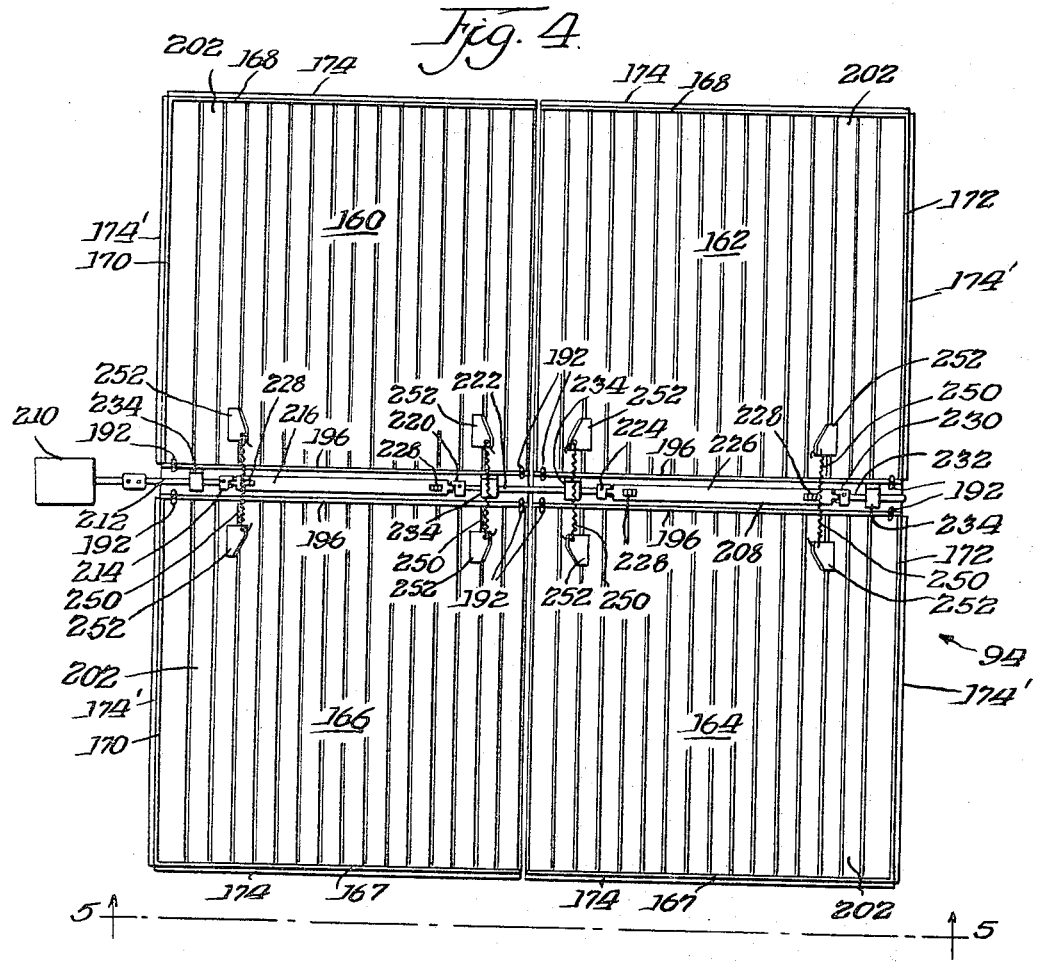
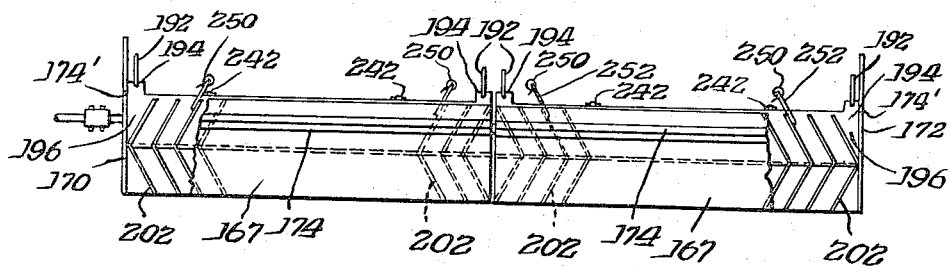

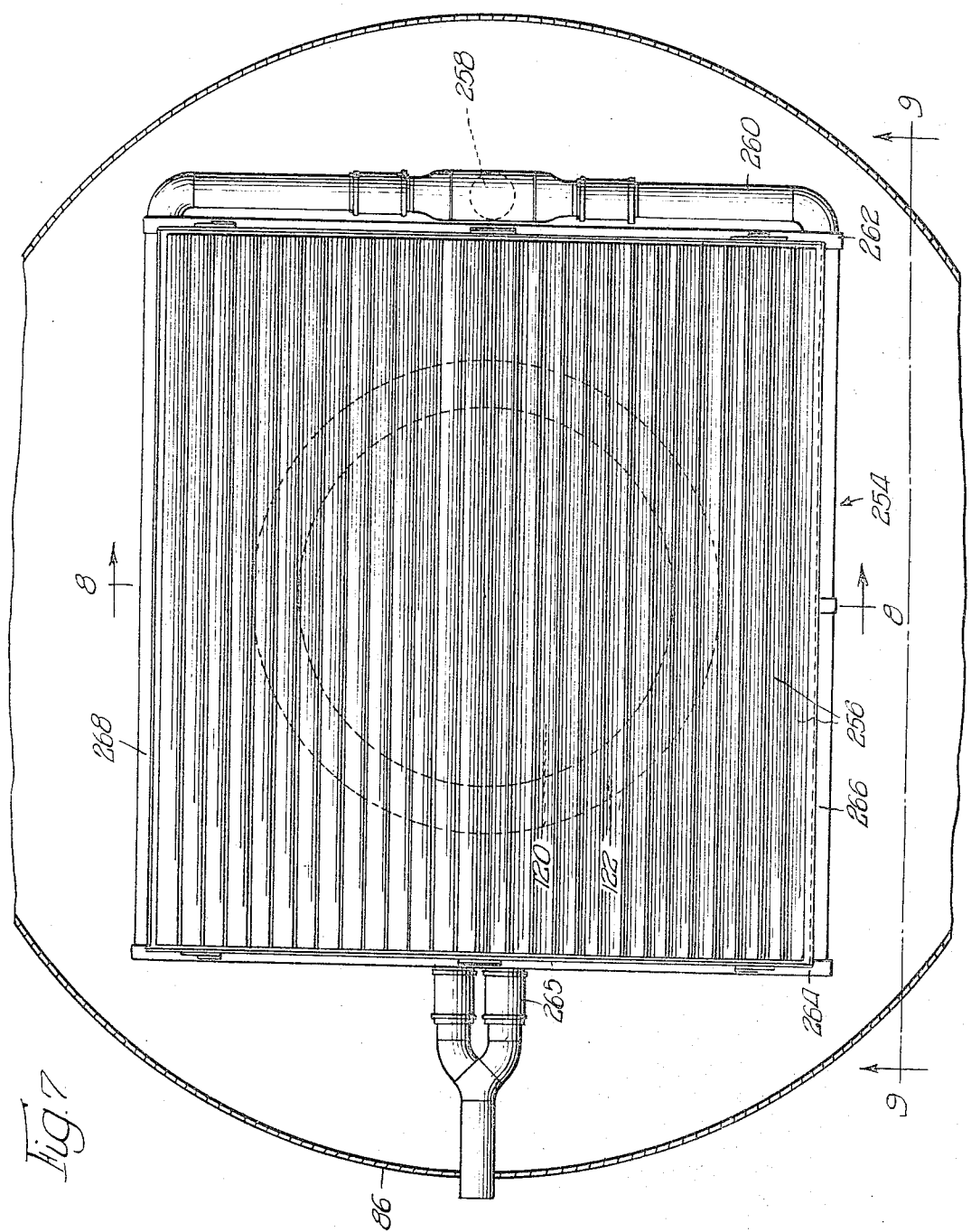

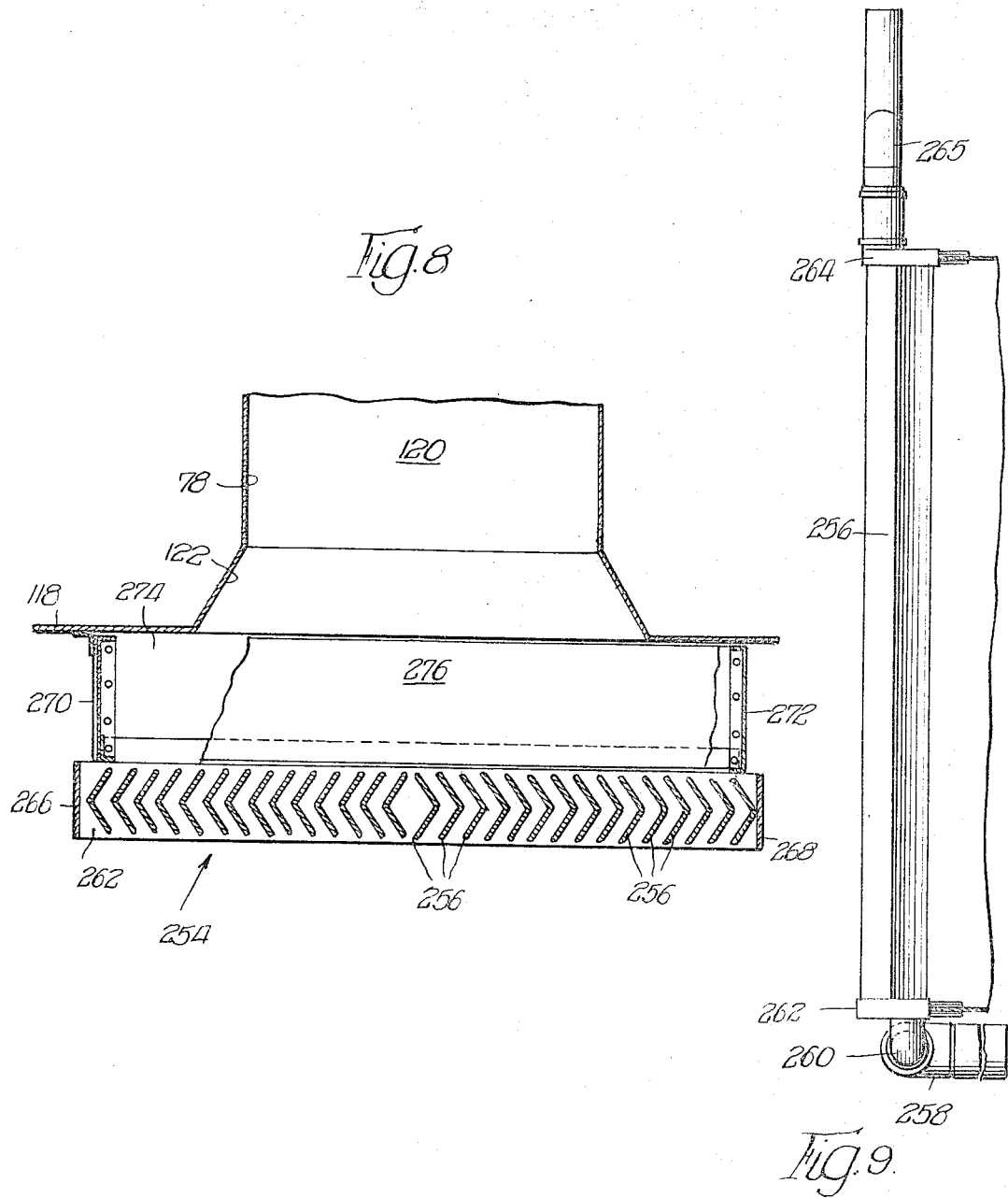

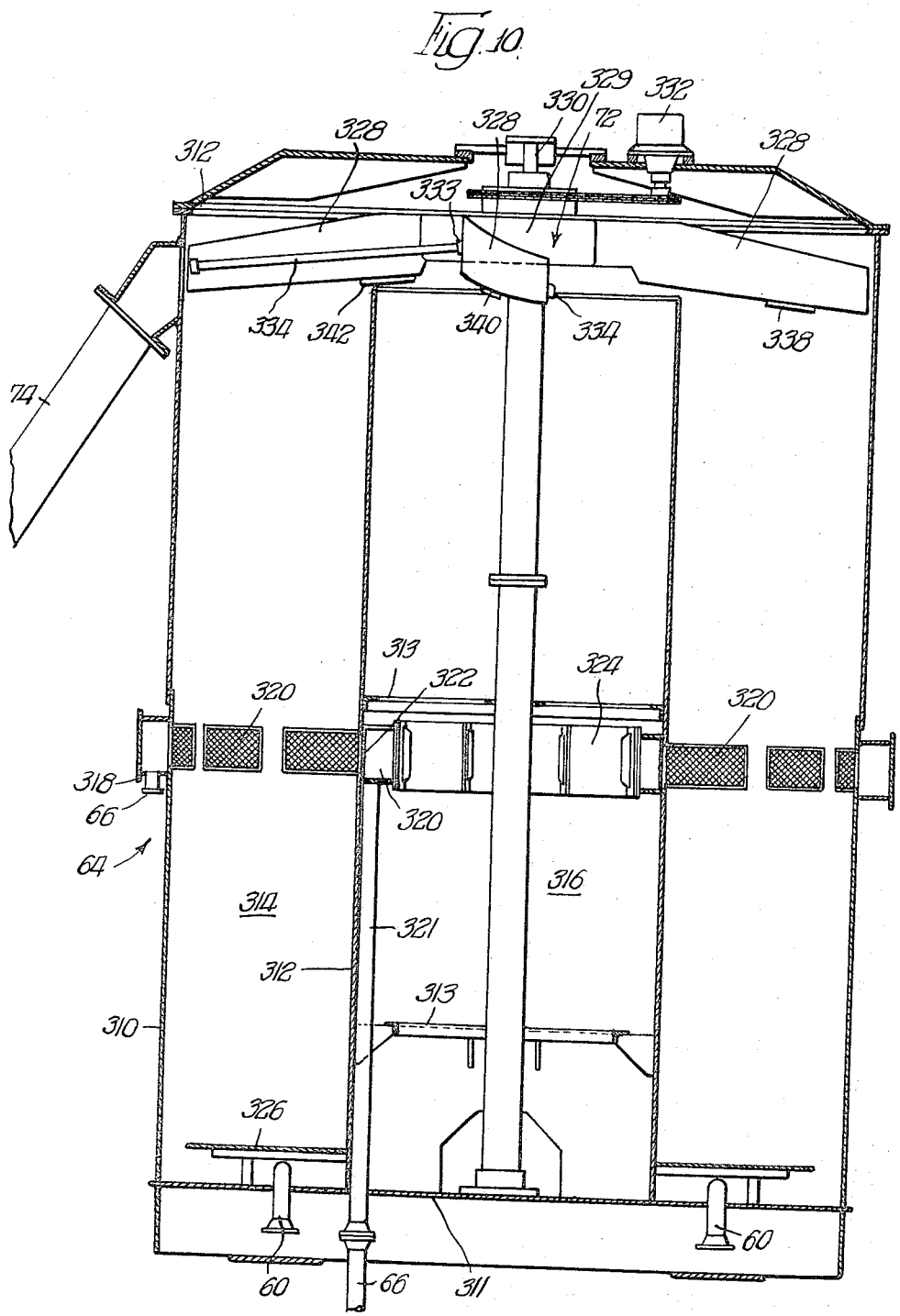

United States Patent Office 3,342,039
Patented Sept. 19, 1967

3,342,039
SEPARATION SYSTEMS AND APPARATUS
Richard R. Bridge, Robert B. Cox, John H. Davids, Dieter K. Emmermann, William F. Engler, Wallace E. Johnson, and Paul A. Weiss, Beloit, Wis., assignors to Desalination Plants (Developers of Zarchin Process) Limited, Tel Aviv, Israel, a limited company of Israel
Filed Feb. 8, 1965, Ser. No. 433,540
45 Claims. (Cl. 62—123)

This invention relates to separation systems and apparatus for separating a solvent in substantially pure form from solutions and/or producing a concentration of the remaining solution. The invention more particularly relates to systems and apparatus for producing "sweet" water from sea water, brackish ground water, industrial brines or other solutions containing water.

The systems and apparatus of the present invention are hereinafter described in connection with their application to producing "sweet" water from sea water, but it must be appreciated that the inventions are capable of application to other fields. While in the case of producing "sweet" water from sea water the primary product is "sweet" water, in other applications of the system and apparatus, such as in dehydrating citrus fruit juices, the primary final product may be the concentrated remaining solution after removal of the solvent, and the pure solvent removed may or may not be of importance as a secondary product.

Since the system and apparatus hereinafter described is principally for desalting sea water, the expression "desalination" is used hereafter in identifying the system and apparatus, but it must be appreciated that this term is meant to include the various other applications of the system and apparatus wherein a solvent is to be separated from a solution.

In the past decade or more, this problem of desalination has come under increasing attention and the basic problems have been identified. As a result of work done by others, it has been proposed that "sweet" water may be produced by a vacuum freezing system wherein precooled sea water is introduced into a vacuum evaporator. The sea water so delivered will flash-evaporate, causing the formation of pure water vapor and pure ice, which ice is carried in the remaining concentrated brine solution. In this system, the ice is separated from the brine, washed, and the washed ice delivered to a melting vessel. The vapor which is produced in the evaporator is also withdrawn and delivered to the melting vessel wherein it condenses on the ice resulting in the production of potable water from both condensation of the vapor and melting of the washed ice.

It cannot be over-emphasized that economy of equipment and operation cost is of the greatest concern in desalination and, while in most products economy is a factor, in the case of desalination unless equipment costs and operation costs are economical, there is no wide-scale application possible for the system. If it is not economical, it fails.

Applicants have perfected a system and apparatus of the vacuum freezing type which is practical and economical in producing potable water. Applicants have worked continuously with the "sword" of failure for high cost always poised. Every step of the method or piece of equipment must be so correlated with the system as to be economical in construction and economical and efficient in operation. As a result of this intensive work, applicants have developed the systems and apparatus for desalination forming the subject of this invention.

Broadly speaking, the systems of this invention comprise means for delivering sea water to a vacuum evaporating chamber at temperatures necessary to produce flash-evaporation and the attendant formation of ice, vapor, and concentrated brine, means for separating the ice from the brine and disposing the ice in a condensing chamber contiguous to the evaporating chamber and means for delivering the vapor formed within the evaporating chamber into the condensing chamber along the most direct path for condensation of the vapor and melting of the ice.

Generally speaking, the apparatus of this invention comprises: a heat exchanger in which the sea water is precooled by passing the sea water in heat exchanging relationship with the "sweet" water final product and the concentrated brine solution being evolved from the system; a device for removing excess heat from the apparatus, an evaporating chamber maintained under vacuum and into which the precooled sea water is delivered; a device for separating the ice from the concentrated brine and for cleansing surface salt from the ice; a condensing chamber contiguous to the evaporating chamber into which the ice is delivered; a compressor arranged within the confines of one of the chambers and communicating between the chambers for the passage of vapor along a path as directly as possible from the evaporating chamber to the condensing chamber.

Accordingly, independent objects of our invention are to provide economical and efficient systems and apparatus for desalination:

(a) Wherein vapor produced in the evaporating chamber is delivered in a direct and short path to the condensing chamber;

(b) Wherein vapor produced in the evaporating chamber is moved radially outward into the condensing chamber;

(c) Wherein vapor is moved radially outward into the condensing chamber with a minimum of super-heat added thereto; or (d) Wherein the ice is distributed in a condensing chamber with substantial surface exposure for condensing the vapor.

Accordingly, further independent objects of our invention are to provide economical and efficient apparatus for desalination:

(a) Wherein contiguous evaporating and condensing chambers are provided with direct communication therebetween through a compressor;

(b) Wherein the evaporating chamber and melting chamber are concentrically arranged;

(c) Wherein the evaporating chamber, melting chamber, and compressor are concentrically arranged;

(d) Wherein an evaporating chamber and contiguous condensing chamber are provided with a compressor communicating therebetween and housed by one of the chambers.

(e) Wherein contiguous evaporating and condensing chambers are provided and apparatus is provided for enhancing distribution of the sea water within the freeze evaporating chamber to promote vapor formation;

(f) Wherein contiguous evaporating and melting chambers are provided, and new and improved means are provided for exposing ice within the melting chamber to enhance surface exposure of the ice to vapor for promoting vapor condensation and ice melting;

(g) Wherein the compressor is of simple and economical design due to the arrangement of the condensing and freeze evaporating chambers and includes new and improved means for washing the compressor;

(h) Wherein ice and concentrated brine are separated and the brine on the surface and the intersticies of the ice crystals is washed therefrom in new and improved wash separator means; or (i) Wherein the arrangement of parts limits the power losses of the system.

These and other objects, features and advantages of the present invention will become more readily apparent as this description proceeds and is read in conjunction with the accompanying drawings in which:

FIGURE 2 is a generally schematic elevational view in section showing details of construction and arrangement of the compressor and freeze evaporating and condensing chambers of a hydro-converter unit having application in the system of FIGURE 1;

FIGURE 3 is a plan top view in section taken along line 3—3 of FIGURE 2 illustrating details of means for enhancing surface exposure of sea water in the freeze evaporating chamber;

FIGURE 4 is a plan top view taken along line 4—4 of FIGURE 2 illustrating details of means in the freeze evaporating chamber for minimizing carry-over of brine-water droplets entrained in the vapor produced in the freeze evaporating chamber;

FIGURE 5 is a side view in elevation taken along line 5—5 of FIGURE 4;

FIGURE 6 is an enlarged view in partial section of the shock device of the means of FIGURE 4 and partially broken to facilitate illustration;

FIGURE 7 is a top plan view of an alternative embodiment of means for minimizing carry-over of brine-water droplets entrained in vapor from the freeze evaporating chamber;

FIGURE 8 is a view taken along line 8—8 of FIGURE 7;

FIGURE 9 is a view taken along line 9—9 of FIGURE 7;

FIGURE 10 is an enlarged view in vertical section of a counterwasher assembly illustrating details of construction and arrangement of the present invention.

*Desalination system*

Figure 1:
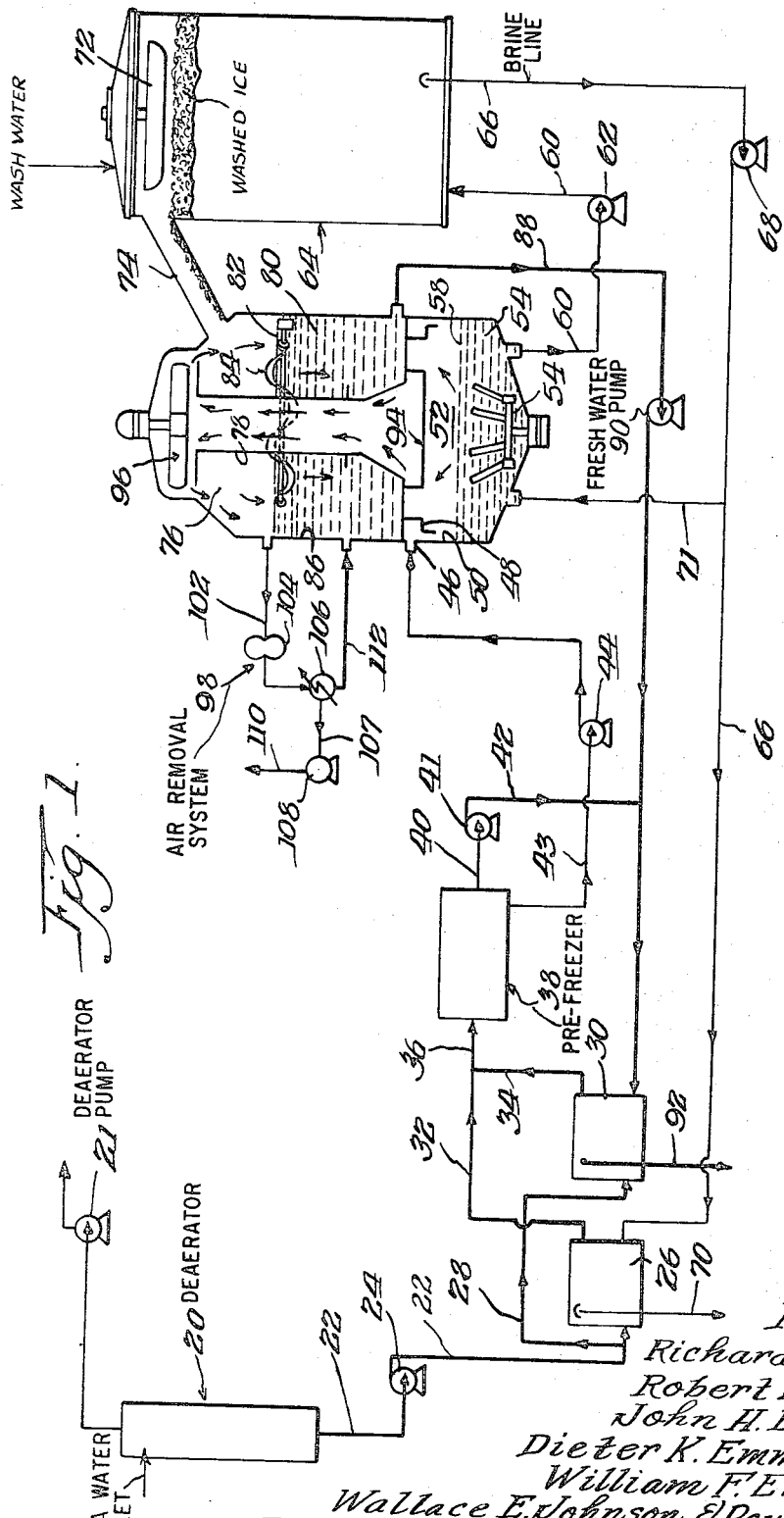
FIGURE 1 is a generally schematic layout of a desalination system constructed in accordance with the principles of the present invention.

Referring to FIGURE 1 which shows schematically the system of the present invention, sea water is illustrated as being introduced into a deaerator 20 which, under the influence of the vacuum pump 21, removes dissolved non-condensable gases and the like from the sea water. Means (not shown) may be provided to remove large solid objects and the like from the sea water prior to introduction thereof into the deaerator 20. The deaerated sea water is removed from the deaerator 20 over line 22 under the influence of a pump 24.

A portion of the sea water is introduced into a heat exchanger 26 from line 22 while a portion of the sea water is bypassed from line 22 over a line 28 to a second heat exchanger 30. In the heat exchanger 26 the sea water is passed in indirect heat exchange with cancentrated brine which is supplied from another portion of the system. In heat exchanger 30 the sea water is passed in indirect heat exchange with water which may be produced as an end product of the system. Preferably the flow of sea water in the heat exchangers 26 and 30 is countercurrent to the flow of the brine and the product water. Preferably the heat exchangers are of a stacked-plate design including spaced aluminum sheets defining therebetween a pair of countercurrent fluid flow paths for the sea water and the brine or product water.

In the heat exchangers 26 and 30, the temperature of the incoming sea water is substantially reduced to pre-cool the sea water prior to introduction thereof into the vacuum flash freeze evaporating chamber 52, to be later described, of the system. Such pre-cooling in the heat exchangers 26 and 30 cools the sea water for vacuum flash evaporation thereof in the vacuum flash freeze evaporating chamber 52.

From the heat exchanger 26, the sea water is discharged into a line 32 which also communicates with a discharge line 34 of the heat exchanger 30 and the pre-cooled sea water is then supplied over line 36 to the pre-icer of pre-freezer 38.

It will be appreciated that undesired excess heat from external sources is introduced into the desalination system and that this excess heat will eventually be evidenced in such system by the presence in the condensing chamber of an excess amount of vapor which could not be condensed on the ice produced in the system. This excess vapor would thus affect the efficiency of the system and result in degeneration of the system to the point where the system would be rendered inoperable.

Consequently, to compensate for the presence of such excess vapor so produced, means are provided to compensate for such heat gain in the system and may take the form of the pre-icer or pre-freezer 38 which is employed to produce ice from a portion of the sea water. It will be appreciated that with employment of the pre-freezer 38 the additional ice produced in the pre-freezer 38 is available for use in the condensing chamber for subsequent condensation of any excess vapor there present resulting from the effects of excess heat from external sources introduced into the system. The pre-freezer 38 can be of any conventional construction, such as the indirect freezing unit known in the trade as a "Pakicer," manufactured and sold under that name by Vilter Manufacturing Corporation of Milwaukee, Wis., U.S.A.

The condensate, if any, produced in the pre-freezer, which condensate would be pure water, may be removed over a line 40 under the influence of a pump 41 and supplied by a line 42 to the product water line supplying product water to the heat exchanger 30, as will be more fully discussed hereinafter.

The sea water-ice slurry is discharged from the pre-freezer into a line 43 which, under the influence of a pump 44, may supply the sea water-ice slurry to an inlet 46 of distribution means 48, as illustrated in FIGURE 1, which causes the sea water to flow downwardly and annularly along a vertical cylindrical side wall 50 of a vacuum freeze evaporating chamber 52 or the line 43 may discharge the slurry into the chamber 52 from a location below the surface of a pool 54 of ice and brine in the chamber 52. The sea water flowing into the chamber 52 is supplied at a predetermined rate sufficient to form and maintain the pool 54.

To establish normal operating vacuum conditions in the chamber 52, the pressure of the chamber 52 is initially reduced by vacuum means 108 (FIGURE 1) below the vapor pressure of the sea water at a specific temperature. At this pressure and temperature, some of the water flash evaporates and absorbs its heat of evaporation from the sea water, the temperature of which consequently falls to a lower level with a correspondingly new lower vapor pressure. As long as vacuum conditions are maintained in the chamber 52, the pressure in the chamber is reduced below the new vapor pressure and more water vaporizes, thus cooling still further the remaining sea water. Eventually, the pressure conditions in the chamber 52 fall below approximately 3.99 mm. Hg and the temperature conditions in the chamber 52 drop to less than 29° F. Since sea water has reached its freezing point, the cooling effect of further vaporization causes ice formation in the sea water which now boils and freezes simultaneously. The ice is carried in the pool 54 and the vapor flows upward in the chamber 52. Because the heat absorbed by vaporization is approximately seven and one half times the heat liberated by ice crystallization, each pound of vapor formed will produce approximately seven and a half pounds of ice.

In the pool 54 is disposed a scoop flinger device 56 which is shown located partially below the surface level 58 of the pool 54.

The scoop flinger 56 is rotated and hollow tubes thereof pass sea water therethrough from below the surface of the pool to distribute randomly the water in to the vacuum space above the level 58 of the pool 54 and against the wall 50 of the chamber 52 to enhance distribution of sea water, increase exposure of sea water to the vacuum conditions in the chamber and prevent ice accumulations on the wall 50.

The slurry of ice and brine formed from the sea water in the chamber 52 is discharged over a line 60 under the influence of a pump 62 and is flowed along the line 60 into a counterwasher assembly 64 wherein the ice in the ice brine slurry is separated from the brine and washed. The separated brine is removed from the counterwasher assembly 64 over a line 66 under the influence of a counterwasher assembly 64 over a line 66 under the influence of a pump 68 for supply thereof to the brine-sea water heat exchanger 26 from which the brine is discharged for final disposition over a line 70.

A portion of the brine may be recycled to the pool 54 in the freezing chamber 52 to increase the fluidity of the ice-sea water slurry in the pool 54.

The ice in the counterwasher assembly 64 continuously moves upwardly and, with the removal of brine therefrom, forms a porous ice mass plug or "piston."

Wash water is introduced into the counterwasher assembly 64 by means (not shown in FIGURE 1) so that it flows countercurrently to the flow of the ice mass porous plug or "piston." The wash water is introduced onto the top surface of the ice mass and flows downwardly, as viewed in FIGURE 1 to wash brine from the surfaces and intersticies of the ice mass so that the top surface of the ice mass is substantially free of salt or having a salt content which is at a level sufficiently low for drinking or commercial use.

The top surface layer of the upwardly moving ice mass is continuously removed from the ice mass in the counterwasher assembly 64 by a rotatable scraper device 72 which moves the ice to a chute 74 which supplies the ice to a melter-condensing chamber 76 which is shown co-axially disposed with the vacuum freeze evaporating chamber 52 to facilitate flow of vapor from the evaporating chamber 52 to the condensing chamber 76.

The vapor produced in the chamber 52 and the ice delivered by the chute 74 are delivered to the melter-condensing chamber 76 so that the ice is contacted with the vapor to condense the vapor and melt the ice thereby forming in the chamber 76 a pool 80 having a surface level 82. Ice in the pool 80 floats adjacent the surface 82. Disposed axially with or below the surface 82 of the pool 80 is a stirring or mixing auger type device 84. The auger device 84 turns the ice adjacent the surface 82 of the pool and thereby enhances the surface exposure of the ice to the vapor for purposes of increasing the condensation and melting interaction of the vapor and ice.

The product water in the pool 80 is removed over a line 88 (where it may be joined by condensate from the pre-freezer supplied over line 42) under the influence of a pump 90 to the product water-sea water heat exchanger 30 for counter-current indirect heat exchange flow with the incoming sea water. This product water is removed from the heat exchanger 30 over a line 92 for storage or other disposition.

Since some salt brine-water droplets will become entrained or entrapped in the vapor as it flows from the chamber 52 to the chamber 76, a device 94, hereinafter referred to as "a carry-over separator device," is employed which is positioned in the flow path of the vapor in the chamber 52. The device 94 presents a plurality of closely spaced impingement surfaces. These surfaces define a tortuous vapor flow path wherein the vapor carries these brine droplets into impingement relation with these surfaces whereby the brine-water droplets are prevented from passing upwardly into the compressor 96. For if the blades of the compressor are constructed of thin flexible sheet material, the ice and/or salt accumulation which would be formed by the collection of the brine-water droplets in the compressor could cause damage to the compressor and/or disturb the dynamic balance of the compressor.

To remove non-condensable gases and the like that might otherwise accumulate in the condensing chamber 76 an air removal system 98 is employed which includes a discharge line 102 communicating with the chamber 76 through the outer wall 86 of this chamber, a rotary blower 104 of conventional construction, and a condenser 106 from which non-condensable gases are supplied over line 107 under the influence of a vacuum pump 108 for discharge over a vent line 110 and which also supplies condensate over a return line 112 which communicates with the chamber 76 through the wall 86. This air removal system contributes to the efficiency of the condensing chamber by removing air and other non-condensable vapors which would otherwise tend to interfere with melting of the ice and condensing of water vapor in the melter-condensing chamber 76.

The sub-assemblies and conduits of the desalination system may be suitably insulated, for example, with a polyurethane spray foam of low K value, i.e., coefficient of heat transfer.

Figure 2:
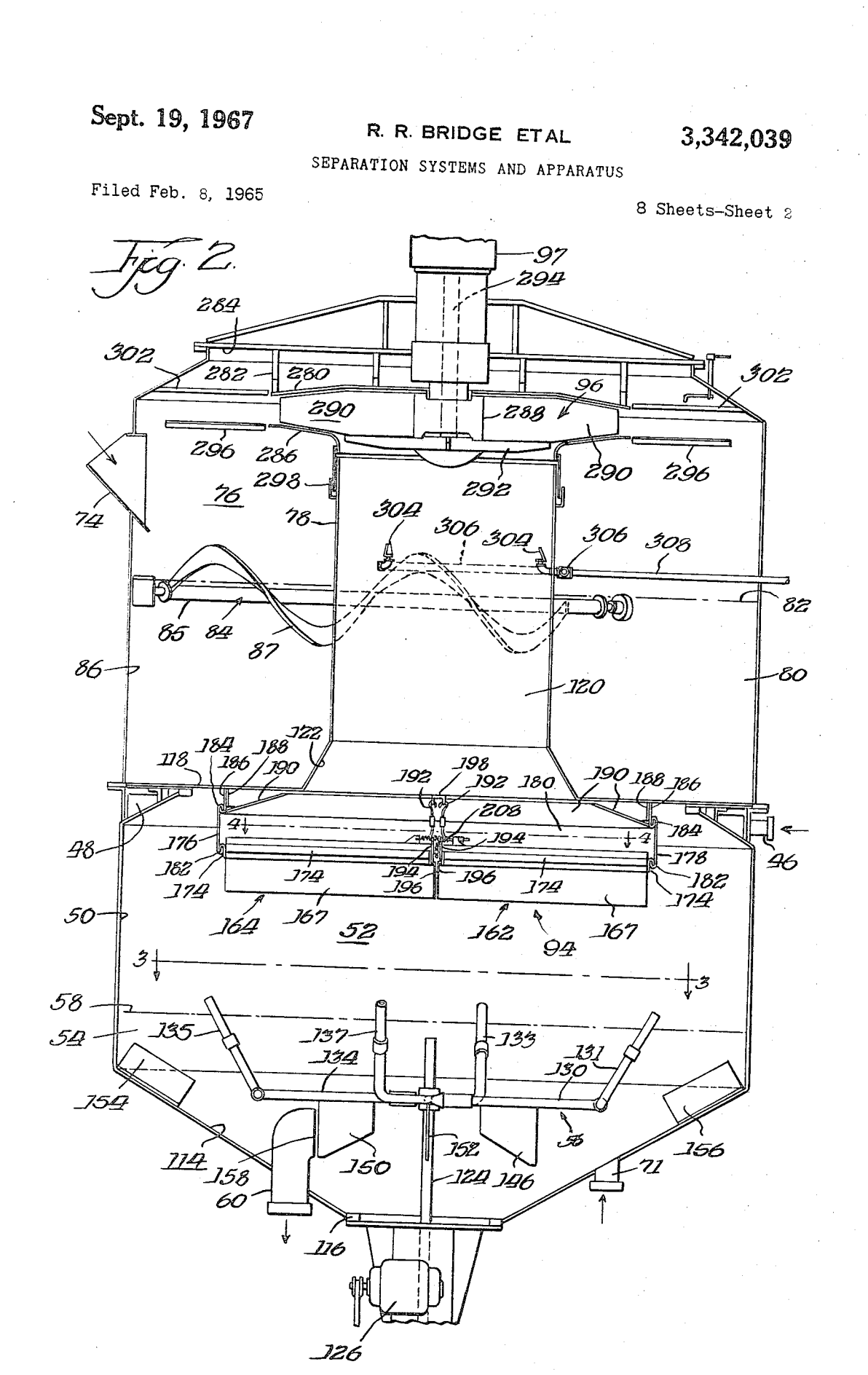

Referring now to FIGURE 2, there is disclosed details of a preferred arrangement of a vacuum freeze evaporating chamber 52 for flash evaporation of water of the sea water.

The vacuum freeze evaporating chamber 52 is defined by the vertical side wall 50, a frusto-conical lower side wall 114 joined to the wall 50 and to a flat bottom wall 116. A top wall ring 118 having a central aperture therein communicates the chamber 52 with an elongated cylindrical vapor flow section 120 which is defined by a frusto-conical lower wall 122 which is joined to the cylindrical common wall 78.

The incoming sea water is introduced into the chamber 52, as aforesaid, to flow annularly and downwardly along the vertical cylindrical side wall 50 to form the pool 54 having a surface level indicated by the dash-dot line 58.

Disposed in the chamber 52 is the scoop flinger device 56 illustrated in FIGURES 2 and 3.

The scoop flinger device 56 is rotated by a shaft 124 which is driven by a motor 126 (FIGURE 2) located externally of the chamber 52. The scoop flinger device 56 includes a hub 128 carrying a plurality of radiating arms, four of which are shown in FIGURES 2 and 3. The arms, identified by the numerals 130, 132, 134 and 136, extend radially and normal to the shaft 124. The arm 130 carries a tube 131; the arm 132, a tube 133, the arm 134, a tube 135, and the arm 136, a tube 137. Each of these tubes 131, 133, 135 and 137, as illustrated in the drawing, are shown bent at a right angle and has one leg thereof disposed upwardly and divergently away from the axis of the shaft 124.

At its end adjacent the corresponding arm, each of the tubes 131, 133, 135 and 137 is provided with enlarged inlet heads 138, 140, 142 and 144, respectively, for supply of sea water to the end outlets of these tubes.

A feature of the present invention resides in the operation of the scoop flinger device 56 in that rotation of the device 56 counterclockwise as viewed in FIGURE 3 will cause passage of sea water and probably some ice into the inlets 138, 140, 142 and 144 and through the interior of the tubes 131, 133, 135 and 137 to the outlets of these tubes located adjacent the upper surface 58 of the pool from which the sea water is thrown in free flight into the space of the chamber 52 above the surface 58 of the pool. Thus, the tubes 131, 133, 135 and 137 trap a portion of the slurry of the pool 54 from below the surface of the pool and throw the trapped slurry in free flight against a surface, such as the wall 50 or onto the pool surface 58. It will be appreciated that the relative position of the flinger device 56 with respect to the surface 58 of the pool may be adjusted by raising or lowering of the flinger device shaft 124. Such adjustment of the shaft 124 permits distribution of sea water above the surface of the pool from any location or depth level below the surface of the pool whereby the surface exposure of any particular molecule of the sea water in the pool to the vacuum conditions existing in the space above the surface of the pool is enhanced. By disposing the hub and portions of the tubes and arms of the flinger device 56 below the surface of the pool, ice formation on these members on the flinger is minimized. Moreover, by distributing the sea water above the surface of the pool, the residence time and thus the time of ice crystal growth is increased with an enhancement in size of the ice crystals formed. It is noted that smaller ice crystals are more difficult to wash free of brine than large crystals, and thus the flinger device 56 is utilized to condition the ice of the ice-brine slurry produced in the chamber 52 for subsequent washing thereof.

Also because evaporation is a surface phenomenon, evaporation of the water of the sea water is enhanced by use of the flinger device 56, because the surface 58 of the pool is continuously changed by impingement of the sea water and ice crystals returning to the pool from the space above the surface of the pool 58.

Rotation of the flinger device 56 also turbulates the sea water-ice slurry in the pool 54 and prevents formation of large ice aggregations at the surface of the pool which would act as a detriment to evaporation of the water. Such turbulation also minimizes the concentration of salt adjacent the surface of the pool. It will be appreciated that the concentration of salt adjacent the surface of the pool is higher than at points below the surface of the pool, assuming the pool is stagnant, because evaporation is greatest adjacent the surface of the pool.

To further agitate the pool under controlled conditions of agitation, the arms 130, 132, 135 and 136 are provided with downwardly depending, flat mixer plates 146, 148, 150 and 152, respectively. These mixer plates cooperate with fixed vertically disposed vanes which are mounted on the frusto-conical wall 114 of the chamber 52. A plurality of these vanes may be employed, preferably four, and two of these vanes, identified by the numerals 154 and 156, are shown in FIGURE 2.

It is also noted that the mixer plates 146, 148, 150 and 152 are located with relation to the inlet 158 of the ice-brine slurry outlet 60 so that the mixer plates sweep closely adjacent the inlet 158 to remove any ice accumulations from the inlet 158. A grid (not shown) may be employed in the inlet 158 to prevent passage from the chamber 52 of ice masses larger than predetermined size.

The ice-brine slurry is removed from the pool 54 through the outlet 60 under the influence of pump 62 (FIGURE 1) for delivery over the line 60 to the counterwasher assembly 64.

The vapor formed in the chamber 52 flows upwardly into the elongated vapor flow section 120 of the vacuum freeze evaporating chamber. However, some of the brine-water droplets produced as a result of flash freezing of the sea water are entrained in the vapor and are susceptible to being carried over into the condensing chamber under the influence of the compressor 96. These brine-water droplets would, travelling as they do at high velocity, present a problem of impingement of accumulations of salt and/or ice formed from these droplets on parts of the compressor assembly 96 and an attendant problem of damage to these parts.

To minimize "carry-over" of these entrained droplets with the vapor into the condensing chamber, the "carry-over" separator device 94 is employed.

A preferred form of such device 94 is illustrated in FIGURES 4, 5 and 6.

Referring to FIGURE 4, the "carry-over" separator device 94 comprises four spaced sections 160, 162, 164 and 166. Each of these sections includes an outer U-channel shaped frame, two walls of each frame, as more fully hereinafter described, supporting a plurality of spaced V- or chevron-shaped louvres 202 (FIGURE 5).

Each of sections 164 and 166 (FIGURE 4) includes a side wall 167 to which louvres 202 are secured as by welding and each of sections 160 and 162 include a side wall 168 opposite the side wall 167 to which the louvres 202 are secured. Each of sections 160 and 166 includes a rear wall 170 joined, respectively, to side walls 167 and 168 and each of sections 162 and 164 includes a front wall 172 joined to walls 168 and 167, respectively (FIGURE 4).

Each of the walls 167 and 168 carry curved hook flanges 174 (FIGURE 4) for hanging of the device 94 in suspension from the wall 118 of the chamber 52 (FIGURE 2) by a plurality of suspension devices. These suspension devices include side walls 176 and 178. These two walls 176 and 178 are provided with longitudinally extending inturned flange hooks 182 which engage the corresponding flange hooks 174 carried by the walls 167 and 168. The walls 176 and 178 also have inturned hook flanges at the opposite ends thereof indicated in FIGURE 2 by the numeral 184 which engage out-turned flanges carried by the corresponding walls 186 mounted by means of brackets 188 (FIGURE 2) which form a mounting arrangement for the device 94. The walls 176 and 178 cooperate with slideable extensions 174' of walls 170 and 172 of the sections 160, 162, 164 and 166 which (FIGURE 2) form with four top cover plates 190, three of which are shown in FIGURE 2, an enclosure for the area between the frusto-conical section 122 of the flow channel 120 and the space above the device 94 so that flow of vapor from the space in chamber 52 above the pool surface 58 must be through the spaces between the louvres 202 of the "carry-over" separator device 94.

Cooperating with the hooks 182, 184 and walls 186 to carry the four sections 160, 162, 164 and 166 of the device 94 in suspension from the wall 118 are a plurality of eight hooks 192 best illustrated in FIGURE 2. These hooks (FIGURE 5) are carried by a plurality of extensions 194 of a side plate 196 joined in each section to the adjacent rear wall 170 (sections 160 and 166) or adjacent front wall 172 (sections 162 and 164). These walls 196 cooperate with the plates 167, 168, 170 and 172 to form the U-channel shaped frame for each of the sections 160, 162, 164 and 166. The louvres 202 are carried between the plates 196 and opposite side wall 167 or 168 of the four sections of the device 94.

The hooks 192 are secured to a U-shaped channel 198 (FIGURE 2) which extends across the flow channel 120 for securement of the ends thereof to the wall 118. The louvres 202, as appears in FIGURE 6, are provided with a re-entrant portion 204 for securement thereof the corresponding re-entrant portions of the plates 196. A plurality of spaced alignment and impact blocks 206 are carried by one of the re-entrant portions of one or each of the plates 196 to prevent damage and align the adjacent sections and to receive impact during operation of the device 94.

The vapor produced in the chamber 52 flows through the spaces defined by the louvres 202 along a tortuous path into the flow section 120, and a substantial amount of the brine-water droplets entrained in the vapor will impinge on these louvres and drop back into the pool 54 so that the remaining vapor, now substantially free of entrained brine-water droplets, may flow through the chamber 120 under the influences of the compressor 96.

In the event ice and salt particle accumulations form on the louvres, over a period of system operation, which accumulations thereby minimize the area of the flow path across the device 94, a shock actuator assembly 208 is provided for forcefully impacting section 160 with section 162 cyclically out-of-phase with impacting of sections 166 and 164.

The shock actuator device 208 (FIGURE 4) includes a motor 210 having an elongated drive shaft 212 carrying a fixed dog clutch coupling 214 for engagement with a complementary dog clutch coupling of a freely rotatable sleeve 216 rotatably carried by the shaft 212. At its opposite end the sleeve 216 carries a second fixed dog clutch coupling for engagement with a second fixed dog clutch 220 located as indicated by the numeral 222 on the shaft 212. The shaft 212 carries a third fixed dog clutch coupling 224 for engagement with a fixed dog clutch coupling of a second freely rotatable sleeve 226 rotatably carried by the shaft 212. At its opposite end a second fixed dog clutch coupling is carried by the sleeve 226 for engagement with a fixed dog clutch coupling 230 of the shaft 212 in a location indicated by the numeral 232.

To support the shaft 212 and permit limited lateral movement of the shaft in the assembly 94, a plurality of brackets 234 (FIGURE 6) each including a base 236 having spaced outwardly extending shaft bearing flanges 238 and 240 are carried in spaced relation by selected ones of the walls 196 of the four sections of the device 94. The brackets 234 are secured as by screws 237 to the plates 196 of a pair of the sections, for example, sections 160 and 162, as appears in FIGURE 4.

The shock actuator device 208 is provided with the sleeves 216 and 226 and the sleeve and shaft clutch arrangement to cause rotational movement of the sleeves 216 and 226 and impacting of the sections 160 and 166 in out-of-phase relation with impacting of the sections 162 and 164 through a 360° cycle of rotation of the shaft 212.

In traversing an approximately ¼ part of the 360° cycle of rotation of the shaft 212, the clutch couplings of the sleeve 216 and corresponding clutches of the shaft 212 engage and cause rotation of the sleeve 216, while the clutches of the sleeve 226 and corresponding clutches of the shaft 212 are disengaged. A plurality of rollers 228 (FIGURE 4) fixed carried by the sleeve 216 will, during such rotary movement of the sleeve 216 caused by the shaft 212, engage the walls 196 of the adjacent sections 160 and 166 to move these sections outwardly away from each other and from relative positions thereof shown in FIGURES 4 and 6. Upon completion of approximately 90° movement of the shaft 212, the clutches of the sleeve 216 and the engaged clutches of the shaft 212 will disengage, and the freely rotatable sleeve 216 and rollers 228 carried thereby will, under the influence of spring arrangements, to be later described, be continued in free rotation in the same direction to a position 180° from the position shown in FIGURE 6, but at a rotational speed greater than the rotational speed of the shaft 212 with the result that the walls 196 of the sections 160 or 166 will move at a fast rate towards each other and one of the walls 196 of one of the sections 160 or 166 will strike against the impactor blocks 206 (FIGURE 6) carried by the opposite wall 196.

Also, upon completion of initial rotation of the shaft 212 approximately 90° the dog clutches carried by the other sleeve 226 will engage the corresponding clutches on the shaft 212 and a pair of spaced roller devices 228 carried by the sleeve 226 will engage the opposite walls 196 of the sections 162 and 164 and move these sections away from each other from the positions shown in FIGURE 4.

Upon completion of approximately another 90° of rotation of the shaft 212 (or approximately 180° from the position shown in FIGURE 6), the clutches of the sleeve 226 and corresponding clutches of the shaft 212 will disengage, and the sleeve 226, now freely rotatable, will continue to rotate in the same direction but at a greater speed rate, under the influence of spring arrangements to be later described, than the rotational speed of the shaft 212. When the clutches of the sleeve 226 disengage from the corresponding clutches of the shaft 212, the spread apart sections 162 and 164 will move toward each other under the influence of the spring arrangements and will impact by contact of the wall 196 of one of these sections 162 or 164 with the blocks 206 carried by the wall 196 of the other of these two sections.

Upon completion of approximately 180° of the cycle of rotation of the shaft 212 the sections 160 and 166 will have impacted once and the sections 162 and 164 will also have impacted once.

During the first half of the second 180° of the cycle of rotation of the shaft 212, the clutches of the sleeve 216 will again engage the corresponding clutches of the shaft 212, the sections 160 and 166 will be separated, the clutches of the sleeve 216 and corresponding clutches of the shaft 212 disengaged, and the sections 160 and 166 again impacted under the influence of the spring arrangements.

During the last half of the second 180° cycle of rotation of the shaft 212, the clutches of the sleeve 226 will engage the corresponding clutches of the shaft 212, the sections 162 and 164 will be separated, the clutches of the sleeve 226 and shaft disengage, and the sections 162 and 164 impacted a second time. Thus during a complete cycle of 360° rotation of the shaft 212 the two sets of impacting sections impact twice whereby ice accumulations are removed from the louvres 202 by the shock forces imparted thereto by such impacting. Freely rotatable wheels 242 and 244 (FIGURE 6) are employed in the rollers 228 to engage the opposing surfaces 246 and 248 of the walls 196 of the four sections of the device 94. Operation of the device 94 may be continuous throughout operation of the desalination system, if desired.

The operation of the shock actuator device 208 is under the influence of spring arrangements shown on FIGURE 4. Four such spring arrangements are shown in FIGURE 4 and each arrangement includes a pair of mounting brackets 252 which are carried by louvres 202 on opposing sections 160, 166 and 162 and 164. Two such springs 250 span the actuator device 208 transversely between sections 160 and 166 and two such springs 250 span the actuator device 208 between sections 162 and 164. Thus, the actuator device 208 and springs 250 assure speed up rotation of the sleeves 216 and 226 and a sufficient impact force between the sections 160 and 166, and 162 and 164, for removing deposits from the louvres 202.

Referring to FIGURES 7, 8 and 9, there is disclosed an alternative embodiment of a "carry-over" separator device which may be employed as a substitute for the carry-over separator device 94 illustrated in FIGURE 4.

In this alternative embodiment of a carry-over separator device, generally indicated by the numeral 254 in FIGURE 7, a plurality of spaced louvres 256, as shown in FIGURE 8, are open tubes permitting the passage of a fluid therethrough, such as air or water at a temperature sufficient to melt the accumulation of ice on the louvres. The surfaces of the louvres 256 thus may be considered heat exchange surfaces which will melt ice and return the salt deposits and melted ice to the pool 54.

The device 254 includes an inlet 258 which may supply heat exchange air or water to a distributor 260 which supplied an inlet manifold 262 which is in fluid communication with each of the louvres 256.

The hot air or hot water flows through the louvres 256 to a manifold 264 (FIGURE 7) from which the water flows to an outlet 265 for discharge from the separator device 254.

The manifolds 262 and 264 have joining side walls 266 and 268 to complete a rectangular frame providing support for the louvre 256 spanning the opening defined by this frame.

The device 254, as appears in FIGURE 8, may be mounted to the wall 118 of the chamber 52 by a bracket arrangement. The bracket arrangement includes side walls 270 and 272, rear wall 274 and front wall 276 as viewed in FIGURE 8. The side walls and rear and front walls of the mounting arrangement prevent flow of vapor from the chamber 52 into the flow channel 120 except through the spaces between the louvres 256.

During normal operation of the system, the heat exchange air or water may be flowed through the inlet 258, either continuously or intermittently, the louvres 256 and the outlet 265 for heating of the ice and salt deposit accumulations on the louvres 256 to thereby cause removal of these accumulations from the louvres.

The vapor, after it flows into the channel 120, is now substantially free of ice and brine water droplets and, therefore, is conditioned for flow through the compressor assembly 96.

The compressor assembly 96 includes a compressor shroud housing comprising, as shown, an upper frustoconical shroud 280 supported as by rods 282 from a top plate 284 of the assembly disclosed in FIGURE 2.

Co-axially disposed with the condensing chamber is a rotor hub 288 carrying a plurality of radial flexible blades 290. The hub 288 may also carry inducer blades 292 to improve the flow of vapor into the main compressor area. Rotation of the hub and blades is caused by a shaft 294 driven by the external motor 97. A suitable arrangement of a compressor construction is disclosed in the co-pending application, Ser. No. 385,826, now Patent No. 3,255,605, issued June 14, 1966.

To provide for enhanced efficiency of the compressor, a pair of spaced diffuser rings 296 and 302 may be employed which guide the vapor flow from the tips of the compressor blades 290 into the condensing chamber 76.

To assure that vapor leakage loss is minimized, a vapor seal ring 298 may be mounted to the wall 78 whereby the vapor in the condensing chamber which is at a higher pressure than the vapor in the chamber 120 prevents leakage of vapor to the chamber 120 across the parting line defined by the lower end of the compressor shroud 286 and the wall 78.

In the event that some ice particles or salt deposits accumulate on the compressor blades and compressor parts, a compressor wash system is provided in accordance with the present invention. The compressor wash system of the present invention includes a plurality of spaced nozzles 304 located in the chamber 120 adjacent the inducer blades 292 for directing sprays of liquid against the compressor blades and other parts of the compressor. The nozzles 304 are supplied by a manifold 306 which in turn is supplied by an inlet conduit 308. Product water may be employed as the wash water for this purpose. The product water is supplied to the nozzles 304 while the compressor is rotating but some time after the compressor motor is de-energized. The sprayed water from the nozzles 304 will impinge on the compressor blades and parts of the compressor and the impingement will provide a mechanical shearing of any salt accumulations on the blade as the speed of the compressor reduces. In addition, there will be a chemical action of the water in solvating salt accumulations on the compressor into solution. Thus, the present invention provides means for removing substantial quantities of salt particle accumulations from the compressor assembly.

Figure 11:
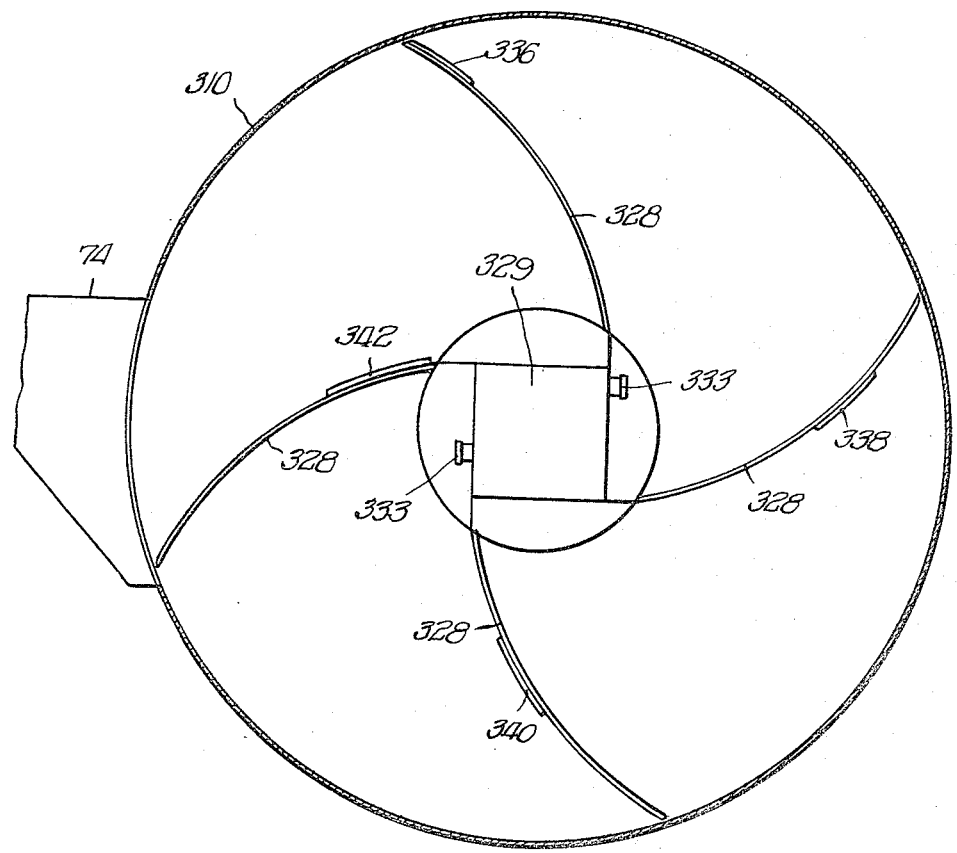
FIGURE 11 is a generally schematic view illustrating the scraper blade arrangement of the counterwasher assembly of FIGURE 10.

Referring now to FIGURES 10 and 11, the ice-brine slurry is supplied over line 60 (FIGURE 1) from which the ice brine slurry is distributed by means (not shown) in the counter-washer assembly 64. A ring 326 is provided for preventing ice clogging adjacent the bottom of the counterwasher assembly during operation shut-down periods. The counterwasher assembly 64 is defined by an outer cylindrical wall 310 and an inner cylindrical wall 312, a bottom wall 311 and a top wall 312. The walls 310 and 312 define an annular chamber 314 into which the ice-brine slurry is distributed from line 60 by means (not shown). The chamber 316 defined by the wall 312 is provided with a plurality of spaced supporting rings 313.

As the ice-brine slurry builds up in the chamber 314 and reaches a level above a brine drainage arrangement, as viewed in FIGURE 10, the brine is removed from the slurry over line 66 under the influence of pump 68. Drainage of the brine from the ice-brine slurry begins to form an ice mass which is porous and which is illustrated in FIGURE 1 schematically. The flow of the brine through the porous ice mass results in a hydraulic gradient across this mass which results in an upward movement force being imparted to the ice mass which cooperates with the natural buoyancy of the ice mass to continue upward movement of the ice. Removal of the brine over line 66 is brought about by passage of the brine from the ice mass through a plurality of outer screens 320 in the wall 310 spaced about the periphery of the chamber 314 which supplies the brine to a manifold 318 in communication with the line 66. To assist in removal of this brine, the inner wall 312 is also provided with a plurality of spaced screens 322 which discharge brine into an annular manifold 320 for discharge therefrom over a line 321 to join the line 66.

As the ice mass forms and moves upwardly, wash water, which may be product water supplied from the condensing chamber 76, is flowed countercurrently to the flow of the ice mass and in contact with the ice mass. The wash water will remove brine from the surfaces and interstices of the ice mass trapped in the ice mass to thereby provide, adjacent the top of the counterwasher assembly 64, an area of ice which is substantially free of brine.

To remove the substantially pure ice from the top surface of the ice mass, the scraper assembly 72 is employed.

The scraper assembly 72 includes a plurality of radial curved blades 328 carried by a hub 329 (FIGURE 11) rotated by a shaft 330 (FIGURE 10) under the influence of a motor arrangement 332. The hub 329 carries a manifold (not shown) having outlets 333 which supply apertured tubes 334 (FIGURE 10) with the aforementioned wash water.

These tubes are disposed adjacent to and carried at their outer ends by the blades 328 to distribute the wash water over the top surface of the ice mass.

In the assembly 72, shown in FIGURES 11 and 12, each of the blades is provided with only an ice cutting blade portion which does not extend the full length of the blade. Thus, with clockwise rotation of the blade arrangement, the blade 328 located at approximately the 12:00 o'clock position would include an ice blade portion 336 at its outer edge in engagement with the ice adjacent the outer wall 310. The blade 328 indicated in FIGURE 11 at approximately a three o'clock position would have its ice cutting blade portion 338 set further inwardly from the wall 310 than the blade portion 336 of blade 328. The ice cutting blade portion of the blade 328 located at approximately the six o'clock position would have its ice engaging blade portion 340 set further inwardly than the blade portion 338 and the ice cutting blade portion 342 of the blade 328 shown in the nine o'clock position of FIGURE 11 would be set further inwardly from the wall 310 than blade portion 340. Thus, these portions 336, 338, 340 and 342 would cut the ice mass surface at different locations. The blade portions 336, 338, 340 and 342 are each of a length sufficient to result in each of these blade portions cutting and moving to the chute 74 a substantially equal quantity of ice with each revolution of the shaft 330.

Employment of the scraper assembly 72 minimizes a number of problems associated with employment of a scraper assembly having blades with the ice cutting edge of each of the blades extending the full length of the blade. For example, if each of the ice cutting edges extended the full length of the blades, a problem of proper alignment of the blades to achieve uniform depth of ice cut would exist. Also, the present invention eliminates the problem of ice accumulations forming ahead of a blade or blades caused by the inter-action of the blade and ice when thin cuts are made, even with blades which are properly aligned for depth of cutting.

The substantially brine-free ice is scraped from the counterwasher assembly 64 by the blades 328 into the chute 74 and from the chute 74 into the condensing chamber 76 onto a rotating basket arrangement (not shown) such as that disclosed in copending application Serial No. 276,507, or, as indicated in FIGURE 2, into the chamber 76 to form a pool 80 having a surface level 82.

Located in the pool 80 adjacent the surface thereof may be one or more agitator devices 84 of the auger type which include a shaft 85 carrying a curved blade 87. The auger device 84 churns the surface of the pool and in this manner changes the surface of the ice exposed to the vapor whereby condensation of the vapor and melting of the ice is enhanced. The resulting water, which is product water or "sweet water," is then removed from the chamber 76 by means (not shown) from adjacent the bottom of the pool 80.

The air removal system 98 during normal operation of the system removes a mixture of non-condensable gases and water vapor over line 102 from the chamber 76 under the influence of the rotary blower 104 which as shown may be a positive displacement lobe type blower. The mixture of non-condensable gases and water vapor leaving the blower 104 is compressed and is supplied into the condenser 106 wherein a portion of the water vapor is condensed and the condensate is returned over line 112 to chamber 76.

The non-condensable gases and remaining water vapor is removed by the vacuum pump 108 through line 107, and discharged to atmosphere in line 110. The air removal system 98, as disclosed provides a feature of the present invention wherein the arrangement of the rotary blower 104 and condenser 106 reduces the volume of the mixture of non-condensables and water vapor which must be removed from the condensing chamber and handled by the vacuum pump 108 to vent this mixture to atmosphere. The presence of this mixture in the condensing chamber would interfere with the heat flux required to efficiently permit condensation and melting in the condensing chamber.

The produce water produced in the chamber 76 by condensation of the vapor and melting of the ice is then flowed over line 88 under the influence of pump 90 for countercurrent heat exchange in the product water-sea water heat exchanger 30 from which the product water is discharged over line 92 to a reservoir or for other disposition.

In operation, the system is subjected to a start-up phase. Referring to FIGURE 1, sea water is passed through the deaerator 20, and flow of the sea water from the deaerator bypasses the heat exchangers 26 and 30 by means (not shown) and into the pre-freezer or pre-icer 38 to produce a small quantity of ice in the sea water (or brine). The ice-brine slurry is transferred from the pre-icer or pre-freezer 38 to the counterwasher 64 for filling of the counterwasher. The brine is withdrawn from the counterwasher, while leaving the ice. Filling of the counterwasher with the ice-brine slurry and removal of the brine continues until the counterwasher is full and sufficient ice has accumulated in the melter to permit operation of the compressor 96.

During start-up the sea water is continuously fed to the counterwasher for the purpose of maintaining a low level of salinity in the counterwasher. Sea water may also be supplied into the vacuum flash freeze evaporating chamber 52 until the desired liquid level under normal operating conditions are established. Vacuum conditions in the freezing chamber 52 are established and maintained by the vacuum pump 108 of the air removal system.

After the fluids in the system have been chilled and the counterwasher and melter have been filled with ice, the air removal system 98 is placed in operation and the normal flows throughout the system are established, for example, through the heat exchangers, pre-icer, freezing chamber and counterwasher. The operation of the compressor 96 is also established to place the system in normal operation.

As an example of operation under normal conditions after start-up, again referring to FIGURE 1, sea water of a salinity of 4.2% at a temperature of 75° F. is supplied at a flow rate of 183 g.p.m. to the deaerator 20 which is operated at about 50 mm. Hg absolute pressure. From the deaerator 20 the sea water, at a temperature of approximately 75° F., is pumped to the heat exchangers 26 and 30. The sea water leaves the heat exchanger 26 at a temperature of approximately 29.5° F. and leaves the sea water heat exchanger 30 at a temperature of approximately 36.4° F. The temperature difference through the heat exchangers 26 and 30 averages approximately 2.4° F. The flows then combine in line 36 for supply to the pre-icer or the freezer device 38.

The ice-brine slurry is supplied from the pre-icer 38 at a temperature of approximately 27.8° F. to chamber 52. Chamber 52 is maintained at an absolute pressure of 3 to 3.5 mm. Hg, and at this pressure the brine boils and freezes simultaneously. The vapor is produced at a rate of about 200,000 cubic feet per minute and is compressed in the compressor 96 to a pressure of about 5 mm. Hg absolute. The rotor tip speed of the compressor 96 to move such a volume of vapor efficiently is approximately 1300 feet per second. The vapor thus compressed is then moved by the compressor into the melting-condensing chamber 76.

The formation of ice increases the salinity of the brine to about 5.5%, and the resulting ice-brine slurry is removed from the chamber 52 over line 60 and introduced into the counterwasher 64. The brine in this slurry has a salinity of approximately 5.5%, the ice theoretically 0%, and the temperature of the ice-brine slurry is approximately 26.5° F.

The salinity of the vapor is theoretically 0% when it is introduced into the condensing chamber.

The brine removed from the counterwasher is removed at a temperature of approximately 27° F. and the brine has a salinity of approximately 5.5% when supplied over line 66 to the heat exchanger 26. The brine removed from the heat exchanger 26 over line 64 is removed at a temperature of approximately 72.4° F. and at a flow rate of 139 g.p.m.

The wash water is introduced into the counterwasher from the tubes 334 (FIGURE 10) at a temperature of approximately 34° F. and a salinity of 0%.

The ice and wash water removed by the scraper device 72 into the chutes 74 and into the condensing chamber 76 has a salinity of approximately 0% and is at a temperature of approximately 32° F. The "sweet" or product water supplied from the melting and condensing chamber 76 is supplied over line 88 to the product water-sea water heat exchangers 30 at a temperature of approximately 34° F. The "product water" is removed from the heat exchanger 30 at a temperature of approximately 72.4° F. and at a mass flow rate of approximately 44 g.p.m.

If desired, a plurality of desalinater systems, such as that appearing in FIGURE 1, may be employed in order to meet a particular water demand of a geographical area. With such use of a plurality of desalination systems, certain efficiencies of use of common controls may be employed, as well as certain efficiencies of staging the systems so that, for example, the brine removed from the counterwasher of one such system may be employed in the freeze evaporating chamber of another system.

Although various minor modifications and alterations of the present invention will become readily apparent to those versed in the art, it should be understood that what is intended to be encompassed within the scope of the patent warranted hereon are all such embodiments as reasonably and properly come within the scope of the patent warranted hereby.

We claim:

1. In a freezing system adapted for separating a vaporizable solvent in substantially pure form from a solution comprising means for deaerating said solution, means for receiving and for cooling the deaerated solution, means including a first chamber for receiving the deaerated and cooled solution, means to maintain said chamber at a pressure sufficient to permit at least a portion of said solvent to vaporize and to form solid solvent from at least a portion of the remainder of the solvent, a plurality a distributing means in said first chamber, said means being movable within said chamber for propelling the solution to randomly distribute said solution in said chamber to enhance exposure of said solvent to the vaporizing pressure conditions in said chamber whereby vapor and a slurry of solid solvent and solution are formed, means for removing said slurry from said chamber and for delivering said slurry to means including a second chamber for separating said solid solvent and solution of said slurry, means for washing said solid solvent, means for delivering said washed solid solvent to a third melting and condensing chamber, means for removing said vapor from said first chamber and for compressing said vapor, means for delivering compressed vapor to said third chamber for contact with said solid solvent to condense said vapor and liquify said solid solvent, and means to remove liquid solvent from said third chamber.

2. The system of claim 1 wherein said first and third chambers are disposed one within the other.

3. The system of claim 1, wherein said first and third chambers are concentric chambers.

4. The system of claim 1 wherein said vapor compressing means is a compressor disposed in one of said first and third chambers.

5. The system of claim 2 wherein said vapor compressing means is a compressor disposed in one of said first and third chambers.

6. The system of claim 3 wherein said vapor compressing means is a compressor disposed in one of said first and third chambers.

7. The system of claim 1 wherein said vapor compressing means is a compressor having flexible blades of thin sheet material.

8. The system of claim 1 including means to maintain a pool of solid solvent and solution in said first chamber and wherein said means for randomly distributing said solution in said first chamber includes an inlet disposable below the surface of said pool and an outlet disposable above the surface of the pool.

9. The system of claim 8 wherein said first chamber is maintained under vacuum conditions and a vacuum space exists above said pool.

10. The system of claim 1 wherein said means for distributing sea water includes a flinger device for randomly projecting sea water in free flight onto said wall and into the vacuum space in the chamber.

11. The system of claim 10 wherein said device includes a rotatable hub having a plurality of radially extending arms each carrying a tube through which sea water is passed for distributing said sea water.

12. The system of claim 11 wherein each of said tubes includes an inlet located beneath the surface of the pool and an outlet located above the surface of the pool, whereby rotation of said device causes sea water to enter said tube inlets and be projected in free flight outwardly from the outlets of said tubes above the surface of the pool.

13. The assembly of claim 12 including means for adjusting the position of said device relative to the surface of the pool.

14. The system of claim 1 including separator means to minimize passage of impurities entrained in vapor produced in said first chamber and flowing through a flow path to said third chamber comprising a device positioned in said flow path, and including at least one louvre defining a tortuous vapor flow path through the device whereby impurities entrained in said vapor impinge on said louvre.

15. The system of claim 14 including a plurality of louvres defining therebetween a plurality of said tortuous flow paths.

16. The system of claim 14 including means for imparting a shock impact force to said device to remove accumulations of impurities from said louvre.

17. The system of claim 1 including separator means to minimize passage of impurities entrained in vapor produced in said first chamber through a flow path to said third chamber comprising at least a pair of spaced devices positioned in said flow path, each of said devices including a plurality of louvres defining a tortuous vapor flow path through the device whereby impurities entrained in said vapor impinge on said louvres, and means for imparting a shock force to said devices.

18. The system of claim 17 wherein said shock imparting means is positioned between said devices for moving said devices from each other and permitting said devices to thereafter impact against each other.

19. The system of claim 18 wherein said shock imparting means includes clutches and rollers for spreading and impacting said devices.

20. The system of claim 14 including means for increasing the temperature of said louvre to liquify solid impurities collected on said louvre to thereby cause removal of impurities from said louvre.

21. The system of claim 14 including separator means adapted to minimize passage of impurities entrained in vapor produced in the first chamber flowing to the third chamber through a flow path comprising a device disposed in said flow path and including a plurality of louvrès defining a tortuous flow path through the device whereby impurities entrained in the vapor impinge on said louvres, and means for passing a fluid through passage means formed in said louvres at a temperature sufficient to liquify impurities for indirect heat exchange of accumulations of impurities collected on said louvres to liquify impurities and to thereby remove said accumulations from the louvres.

22. The system of claim 1 wherein said means for compressing said vapor is a compressor and including wash means for removing soluble solid articles adhering to parts of said compressor including blades and an inlet, said compressor forming a part of said means for compressing said vapor, said wash means including at least one device for supplying a liquid solvent for said soluble particles into contact with the compressor.

23. The assembly of claim 22 including a plurality of spaced nozzles for directing said liquid solvent into the compressor inlet.

24. The system of claim 1 wherein said means for separating said solid solvent separates brine from an ice brine slurry and said means for introducing said ice-brine slurry into said second chamber introduces said slurry at a location adjacent the bottom of the third chamber, and includes brine drainage means including a plurality of screens communicating said second chamber with an outlet for removal of brine from said second chamber, said brine drainage means being disposed between opposite ends of said second chamber whereby flow of brine from said slurry through said screens causes formation of a porous ice mass and flow of the brine through the ice mass produces a pressure gradient across said ice mass which imparts upward movement to said ice mass, and wherein said means for delivering said washed solvent includes means for removing ice from said ice mass and for passing the removed ice from the second chamber adjacent the upper end of said second chamber.

25. The system of claim 24 wherein said ice removal means comprises a rotatable blade device.

26. The system of claim 24 wherein said second chamber is an annular chamber defined by a pair of cylindrical walls, one within the other, and said brine discharge means includes screens located in each of said walls.

27. The assembly of claim 24 including pump means for supplying the ice brine slurry to said chamber.

28. The system of claim 9 including a scraper assembly adapted for removing ice from the surface of a moving ice mass in said second chamber comprising a rotatable hub carrying radially extending blades, each of said blades having an ice engaging portion of a length less than the full length of the blade, said ice engaging portion of each of said blades being spaced relative to the ice engaging portion of each other so that each of said portion cuts a substantially identical quantity of ice as every other portion upon each revolution of the hub.

29. The assembly of claim 28 wherein said blades are curved blades.

30. The assembly of claim 28 wherein each of said blades are contoured to deliver ice to a common location adjacent the outer edges of the blades when said hub is rotated at predetermined speeds.

31. The assembly of claim 28 including means carried by at least one of said blades for supplying water to the ice mass for washing solid impurities from the ice.

32. The assembly of claim 31 wherein said means includes a tube having a plurality of outlet apertures and an inlet aperture in fluid communication with a supply of wash water carried by said hub.

33. The assembly of claim 28 including a plurality of apertured tubes, one of said tubes being carried by each of said blades for supplying water to the ice mass to wash impurities therefrom.

34. The assembly of claim 7 wherein said compressor includes diffuser means for directing the flow of vapor from the first chamber directly into the third chamber.

35. In a freezing apparatus including a vacuum flash freezing chamber, an assembly adapted to distribute sea water in said vacuum flash freezing chamber including at least one wall of said chamber and a vacuum space in said chamber, said assembly comprising a flinger device including a plurality of distributing means, said means being movable within said chamber for randomly projecting sea water in free flight onto said wall and into the vacuum space in the chamber.

36. The assembly of claim 35 wherein said device includes a plurality of radially extending arms each carrying a tube through which sea water is passed for distributing said sea water.

37. The assembly of claim 36 wherein sea water is located in said chamber in the form of a pool, said device is partially located beneath the surface of said pool and said tubes each include an inlet located beneath the surface of the pool and an outlet located above the surface of the pool, whereby rotation of said device causes sea water to enter said tube inlets and be projected in free flight outwardly from the outlets of said tubes above the surface of the pool.

38. The assembly of claim 35 including means for adjusting the position of said device relative to the surface of the pool.

39. The system of claim 1 wherein the means for delivering compressed vapor is a compressor and said compressor has means for supplying a liquid solvent to the compressor parts so as to remove soluble solid particles adhering to said parts.

40. The assembly of claim 39 including a plurality of spaced nozzles for directing said liquid solvent into the compressor inlet flow path.

41. In a freezing system for separating a solvent in substantially pure form from a solution including a chamber for washing an ice mass produced in said system, scraper assembly in said chamber adapted for removing ice from the surface of a moving ice mass comprising a rotatable hub carrying radially extending curved blades, each of said blades having an ice engaging portion of a length less than the full length of the blade, said ice engaging portion of each of said blades being spaced relative to the ice engaging portion of each other blade and to the hub so that each of said portion cuts a substantially identical quantity of ice as every other portion upon each revolution of the hub but from a different location on said ice surface.

42. The assembly of claim 41 wherein each of said blades is contoured to deliver ice to a common location adjacent the outer edges of the blades when said hub is rotated at predetermined speeds.

43. The assembly of claim 41 including means carried by at least one of said blades for supplying water to the ice mass for washing solid impurities from the ice.

44. The assembly of claim 41 including a plurality of apertured tubes, one of said tubes being carried by each of said blades for supplying water to the ice mass to wash solid impurities therefrom.

45. In a freeizng system for separating a solvent in substantially pure form from a solution including vapor condensing chamber, an assembly adapted for removing non-condensable gases and the like from said water vapor condensing chamber comprising rotary blower means communicating with said chamber for receiving a mixture of vapor and non-condensable gases and compressing said water vapor and non-condensable gases, condenser means for receiving said mixture from said blower means to condense said water vapor, means communicating with said condenser means to return condensate of said water vapor to said condensing chamber, and vacuum pump means for removing said non-condensable gases from said condenser means and for venting said gases to atmosphere.

References Cited

UNITED STATES PATENTS

| | | | |
|---|---|---|---|
| 1,946,536 | 2/1934 | Kohler | 239—221 |
| 1,953,500 | 4/1934 | Price | 165—84 |
| 2,080,639 | 5/1937 | Taylor | 62—354 |
| 2,183,496 | 12/1939 | Peters | 165—84 |
| 2,764,488 | 9/1956 | Slattery | 62—123 X |
| 2,991,047 | 7/1961 | Bailys | 165—153 |
| 3,017,751 | 1/1962 | Hawkins | 62—123 X |
| 3,030,030 | 4/1962 | Rosenkranz | 239—251 X |
| 3,070,969 | 1/1963 | Ashley et al. | 62—124 X |
| 3,098,735 | 7/1963 | Clark | 62—123 X |
| 3,119,772 | 1/1964 | Hess et al. | 210—60 |
| 3,132,096 | 5/1964 | Walton | 62—58 X |
| 3,137,554 | 6/1964 | Gilliland et al. | 62—123 X |
| 3,175,372 | 3/1965 | Anderson | 62—123 |
| 3,202,283 | 8/1965 | Chien Liu | 62—123 X |
| 3,240,024 | 3/1966 | Ashley et al. | 62—123 X |
| 3,251,193 | 5/1966 | Wiegandt | 62—123 X |
| 3,255,602 | 6/1966 | Emmermann et al. | 62—123 |

ROBERT A. O'LEARY, *Primary Examiner.*

MEYER PERLIN, *Examiner.*

W. E. WAYNER, *Assistant Examiner.*

UNITED STATES PATENT OFFICE
CERTIFICATE OF CORRECTION

Patent No. 3,342,039                          September 19, 1967

Richard R. Bridge et al.

It is certified that error appears in the above identified patent and that said Letters Patent are hereby corrected as shown below:

Column 2, lines 53 and 54, "chambers." should read -- chambers; --. Column 3, line 57, "cancentrated" should read -- concentrated --. Column 6, line 21, "polyurethane" should read -- poly etherurethane --. Column 9, line 22, "arrangement" should read -- arrangements --; line 32, "fixed" should read -- fixedly --; line 36, "from relative" should read -- from the relative --. Column 15, line 4, "a" should read -- of --. Column 18, line 8, "portion" should read -- portions --.

Signed and sealed this 13th day of April 1971.

(SEAL)
Attest:

EDWARD M. FLETCHER, JR.                    WILLIAM E. SCHUYLER, JR.
Attesting Officer                              Commissioner of Patents